US010356755B2

United States Patent
Kumar et al.

(10) Patent No.: US 10,356,755 B2
(45) Date of Patent: Jul. 16, 2019

(54) INTELLIGENT RESOURCE ASSIGNMENT TO INCREASE THROUGHPUT IN MULTIPLE INPUT MULTIPLE OUTPUT (MIMO) AND CARRIER AGGREGATION (CA) CAPABLE DEVICES

(71) Applicant: QUALCOMM Incorporated, San Diego, CA (US)

(72) Inventors: Akash Kumar, Hyderabad (IN); Pengkai Zhao, San Jose, CA (US); Narayanan Pazhedath Illath, Hyderabad (IN); Hargovind Prasad Bansal, Hyderabad (IN); Vijayvaradharaj Tirucherai Muralidharan, Bangalore (IN); Ahmed Khan, Hyderabad (IN); Mridul Agarwal, Jodhpur (IN); Aritra Ukil, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 4 days.

(21) Appl. No.: 15/822,642

(22) Filed: Nov. 27, 2017

(65) Prior Publication Data

US 2019/0166608 A1    May 30, 2019

(51) Int. Cl.
*H04B 7/0404* (2017.01)
*H04B 7/0413* (2017.01)
(Continued)

(52) U.S. Cl.
CPC .......... *H04W 72/02* (2013.01); *H04B 7/0404* (2013.01); *H04B 7/0413* (2013.01);
(Continued)

(58) Field of Classification Search
CPC .......... H04B 7/02–14; H04B 7/15542–15592; H04B 17/382; H04J 1/16;
(Continued)

(56) References Cited

U.S. PATENT DOCUMENTS 8,345,630 B2    1/2013  Zou et al.
9,565,687 B2    2/2017  Jarrahi et al.
(Continued)

OTHER PUBLICATIONS

International Search Report and Written Opinion—PCT/US2018/062670—ISA/EPO—dated Feb. 15, 2019.

*Primary Examiner* — Timothy J Weidner
(74) *Attorney, Agent, or Firm* — Patterson & Sheridan, LLP

(57) ABSTRACT

Certain aspects of the present disclosure relate to methods and apparatus relating to intelligent resource assignment to increase throughput in LTE multiple input multiple output (MIMO) and carrier aggregation (CA) capable devices. In certain aspects, a MIMO and CA capable wireless communication device communicates with a base station (BS) on multiple component carriers (CCs) through multiple radio frequency (RF) chains. In such aspects, the device tentatively switches one or more first RF chains, not assigned to a first CC of the multiple CCs, to the first CC for evaluating a rank of the first CC. The device then determines that the first CC has a higher rank indication (RI) with the one or more RF chains. The device subsequently evaluates one or more performance factors, in conjunction with the higher rank, based on which the device then additionally assigns one or more second RF chains to the first CC.

27 Claims, 14 Drawing Sheets

(51) Int. Cl.
*H04B 17/382* (2015.01)
*H04J 1/16* (2006.01)
*H04J 11/00* (2006.01)
*H04L 5/00* (2006.01)
*H04W 24/02* (2009.01)
*H04W 24/08* (2009.01)
*H04W 28/08* (2009.01)
*H04W 36/36* (2009.01)
*H04W 72/02* (2009.01)
*H04W 72/12* (2009.01)
*H04W 72/14* (2009.01)
*H04W 76/36* (2018.01)

(52) U.S. Cl.
CPC .............. *H04B 17/382* (2015.01); *H04J 1/16* (2013.01); *H04J 11/0066* (2013.01); *H04L 5/0042* (2013.01); *H04L 5/0098* (2013.01); *H04W 24/02* (2013.01); *H04W 24/08* (2013.01); *H04W 28/085* (2013.01); *H04W 36/36* (2013.01); *H04W 72/1263* (2013.01); *H04W 72/14* (2013.01); *H04W 76/36* (2018.02)

(58) Field of Classification Search
CPC ....... H04J 11/005–0066; H04J 11/0083–0093; H04L 5/003; H04L 5/0042; H04L 5/0058; H04L 5/006; H04L 5/0076; H04L 5/0091–0098; H04W 16/02–16; H04W 24/02–10; H04W 28/0205; H04W 28/0231–0242; H04W 28/08–085; H04W 36/0022–0027; H04W 36/0061–0072; H04W 36/04–22; H04W 36/30; H04W 36/36; H04W 40/02–22; H04W 48/16–20; H04W 72/005–14; H04W 76/19–36; H04W 88/02; H04W 88/04–12; H04W 92/10; H04W 28/0252–0263
See application file for complete search history.

(56) References Cited

U.S. PATENT DOCUMENTS

| | | |
|---|---|---|
| 9,742,533 B2 | 8/2017 | Kazmi et al. |
| 2013/0303168 A1 | 11/2013 | Aminzadeh et al. |
| 2013/0329665 A1 | 12/2013 | Kadous et al. |
| 2014/0098694 A1 | 4/2014 | Damji et al. |
| 2015/0065127 A1* | 3/2015 | Mutya ............... H04W 48/16 455/434 |
| 2015/0271755 A1* | 9/2015 | Karri ............... H04W 52/0229 370/252 |
| 2016/0278106 A1* | 9/2016 | Jarrahi Khameneh ............... H04L 5/0023 455/452 |
| 2017/0324458 A1 | 11/2017 | Liu et al. |

* cited by examiner

INTELLIGENT RESOURCE ASSIGNMENT TO INCREASE THROUGHPUT IN MULTIPLE INPUT MULTIPLE OUTPUT (MIMO) AND CARRIER AGGREGATION (CA) CAPABLE DEVICES

FIELD

The present disclosure relates generally to communication systems, and more particularly, to methods and apparatus relating to intelligent resource assignment to increase throughput in multiple input multiple output (MIMO) and carrier aggregation (CA) capable devices.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards (e.g., Long Term Evolution wireless communications standards) that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by a user equipment (UE). The method generally includes communicating with a base station (BS) on multiple component carriers (CCs) through multiple radio frequency (RF) chains, each of the multiple CCs assigned a number of RF chains among the multiple RF chains. The method also includes tentatively switching one or more first RF chains, not assigned to a first CC of the multiple CCs, to the first CC for evaluating a rank of the first CC. The method further includes evaluating one or more performance factors, in conjunction with the higher rank. The method also includes additionally assigning the one or more second RF chains to the first CC for communicating with the BS, based on the evaluation.

Also described herein are embodiments of a wireless communications apparatus comprising means for executing the method described above.

Also described herein are embodiments of a non-transitory computer readable medium having instructions stored thereon for performing a method described above.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 1 is a block diagram conceptually illustrating an example telecommunications system, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
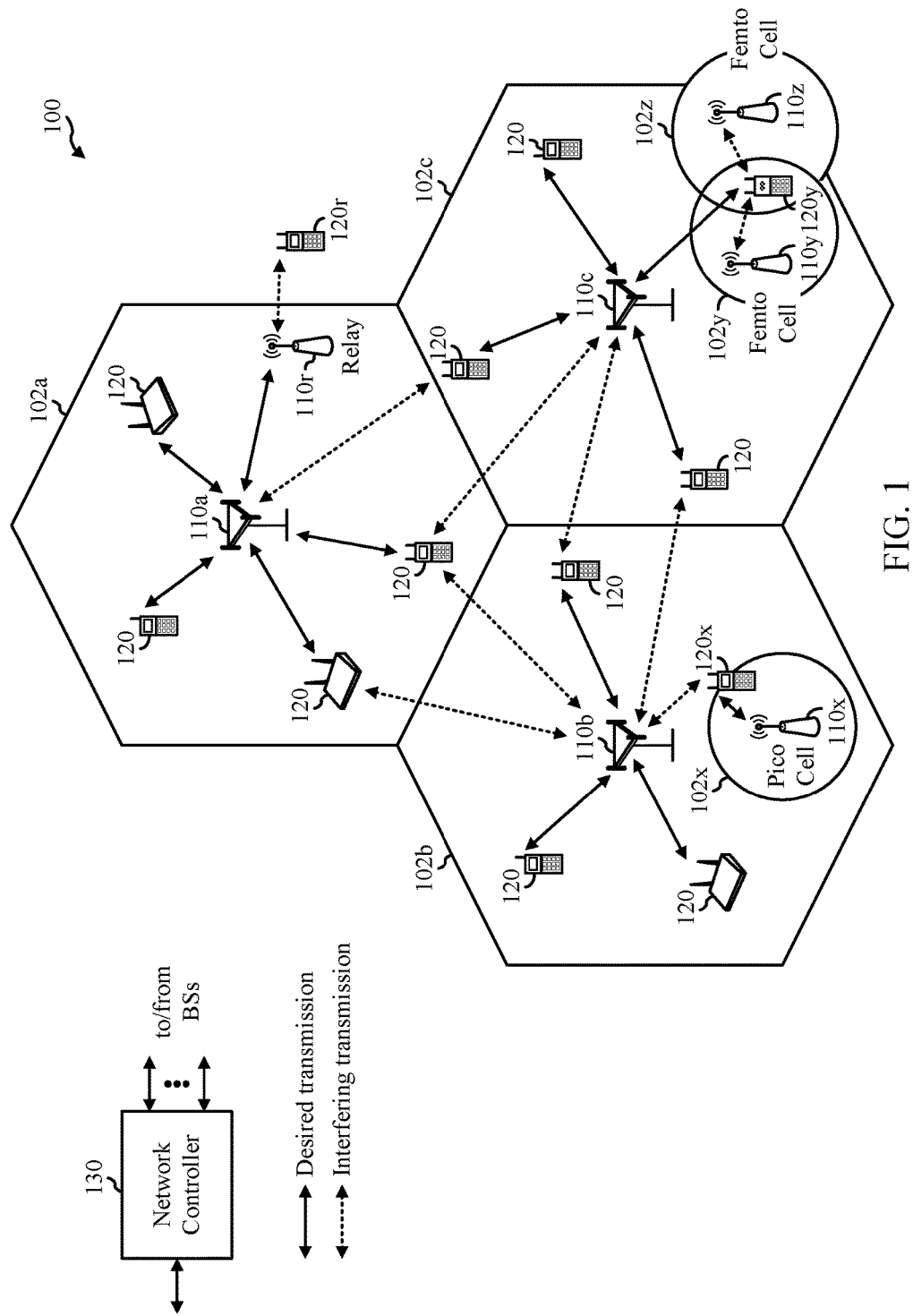

Aspects of the present disclosure relate to methods and apparatus relating to intelligent resource assignment to increase throughput in multiple input multiple output (MIMO) and carrier aggregation (CA) capable devices.

Aspects of the present disclosure provide apparatus, methods, processing systems, and computer readable mediums and new radio (NR) technologies (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
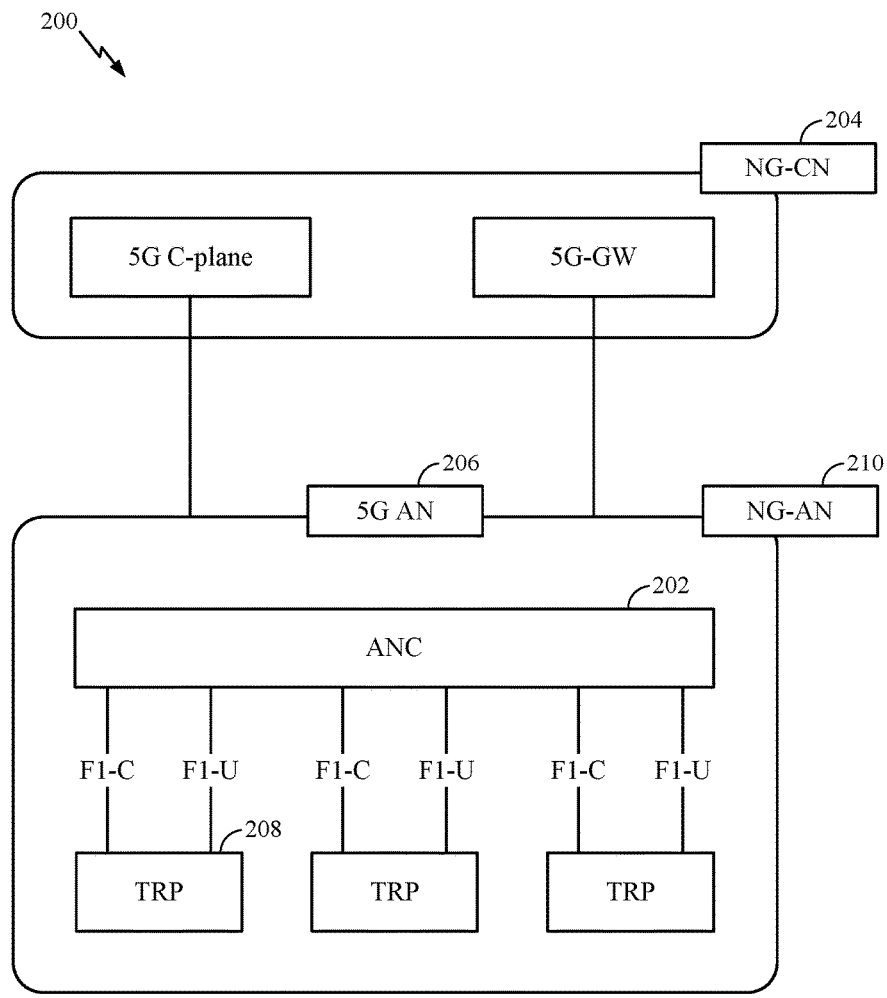
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
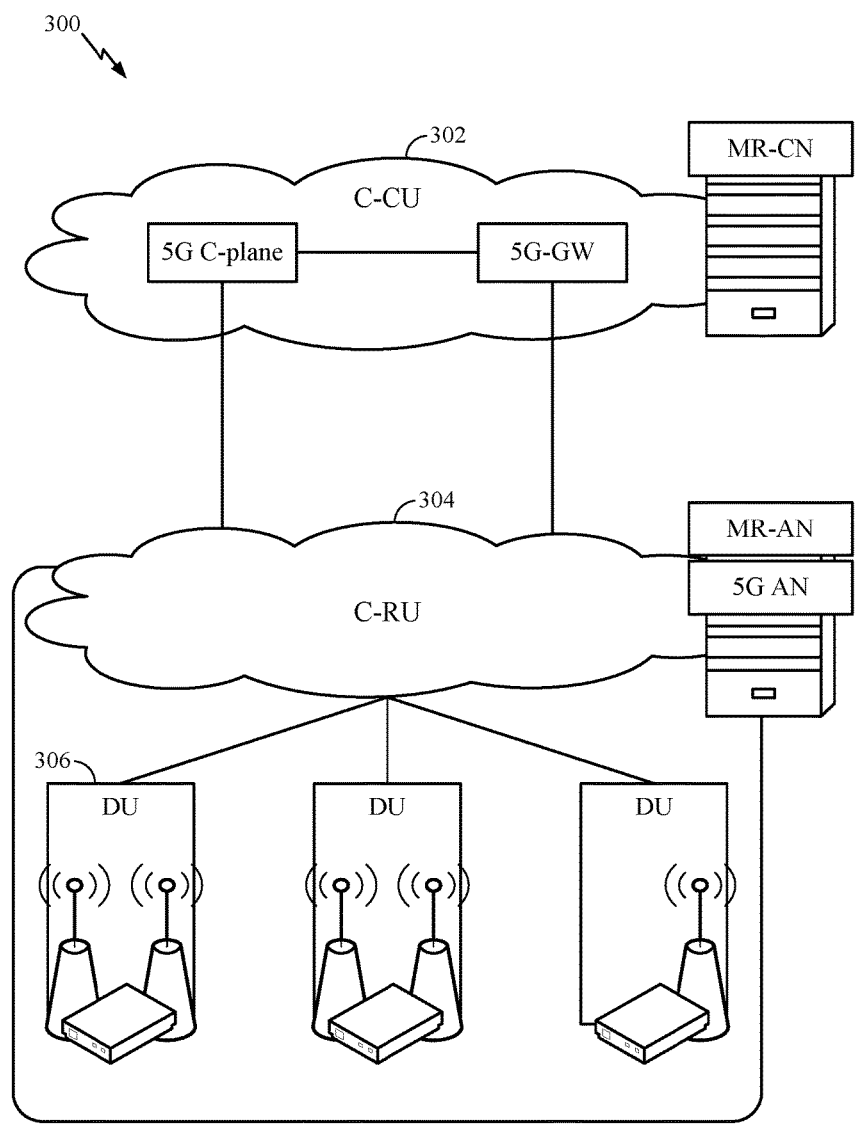
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
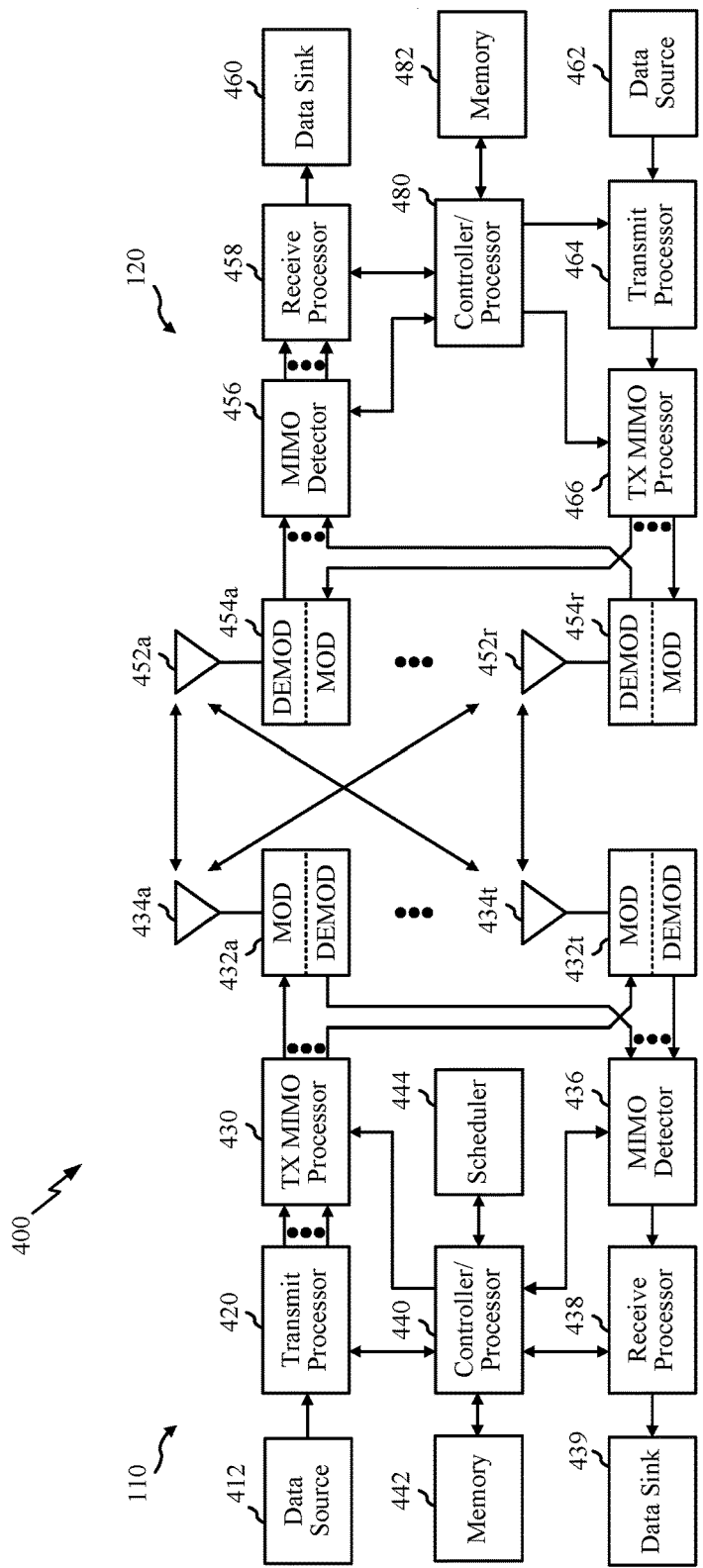
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processings can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 11, and/or other processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
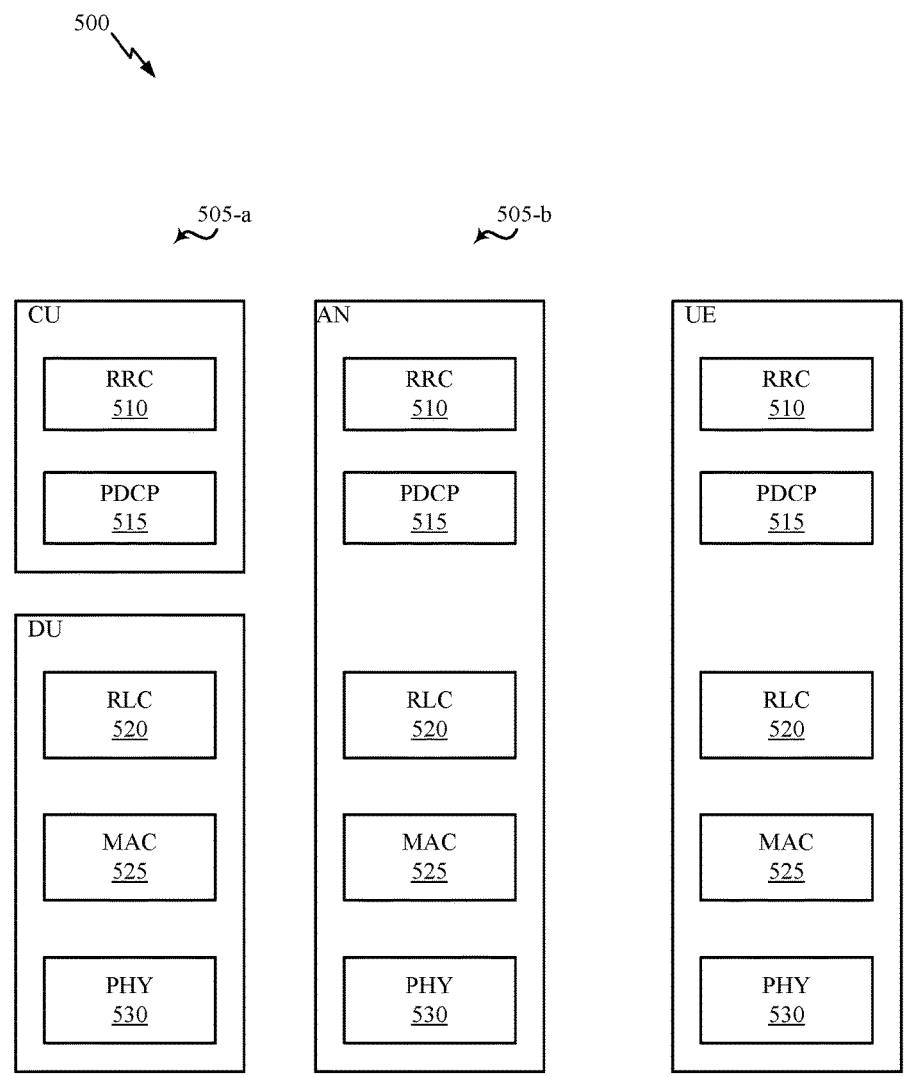
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
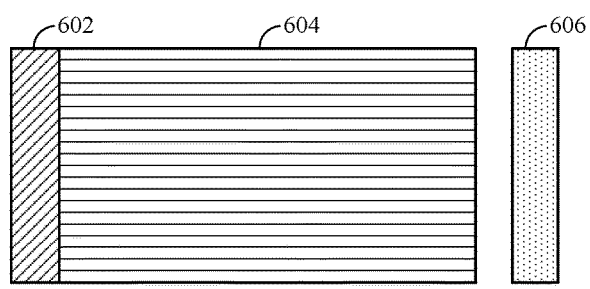
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
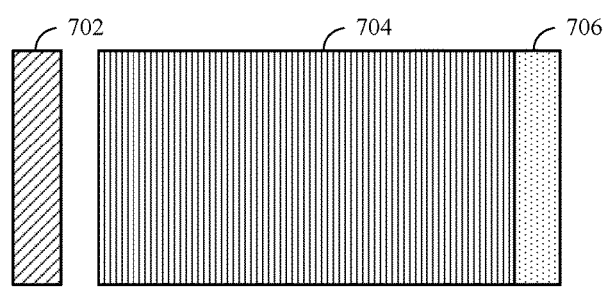
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL data portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Carrier Aggregation

In some cases, UEs may use spectrum of up to 20 MHz bandwidths allocated in a carrier aggregation of up to a total of 100 MHz (5 component carriers (CCs)) used for transmission in each direction.

Figure 8A:
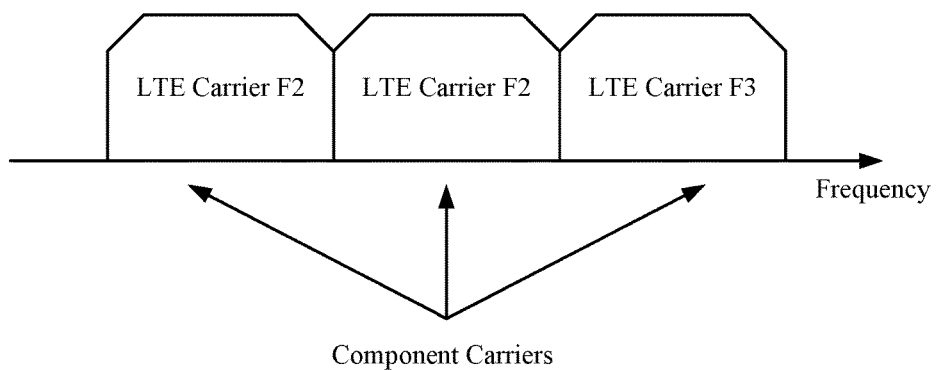
FIG. 8A illustrates an example continuous carrier aggregation type, in accordance with certain aspects of the present disclosure.
Figure 8B:
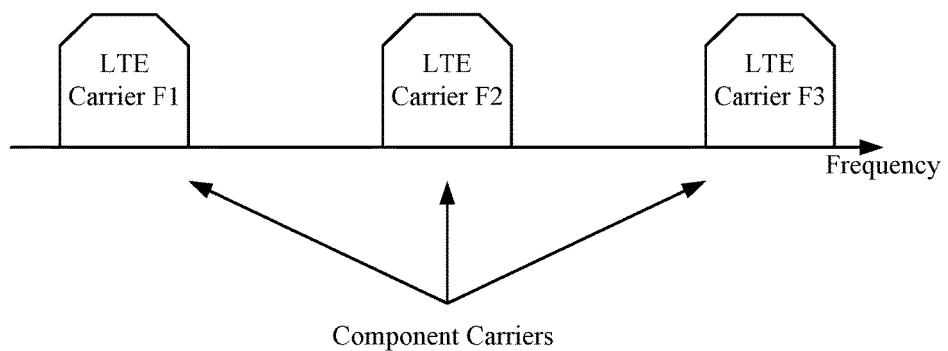
FIG. 8B illustrates an example non-continuous carrier aggregation type, in accordance with certain aspects of the present disclosure.

For example, for the LTE-Advanced mobile systems, two types of carrier aggregation (CA) methods have been proposed: continuous CA and non-continuous CA, as illustrated in FIGS. 8A and 8B, respectively. For continuous CA, multiple available component carriers are adjacent to each other (FIG. 8A). On the other hand, for non-continuous CA, multiple available component carriers are separated along the frequency band (FIG. 8B). Both non-continuous and continuous CA aggregate multiple LTE/component carriers to serve a single unit of LTE Advanced UE.

Figure 9:
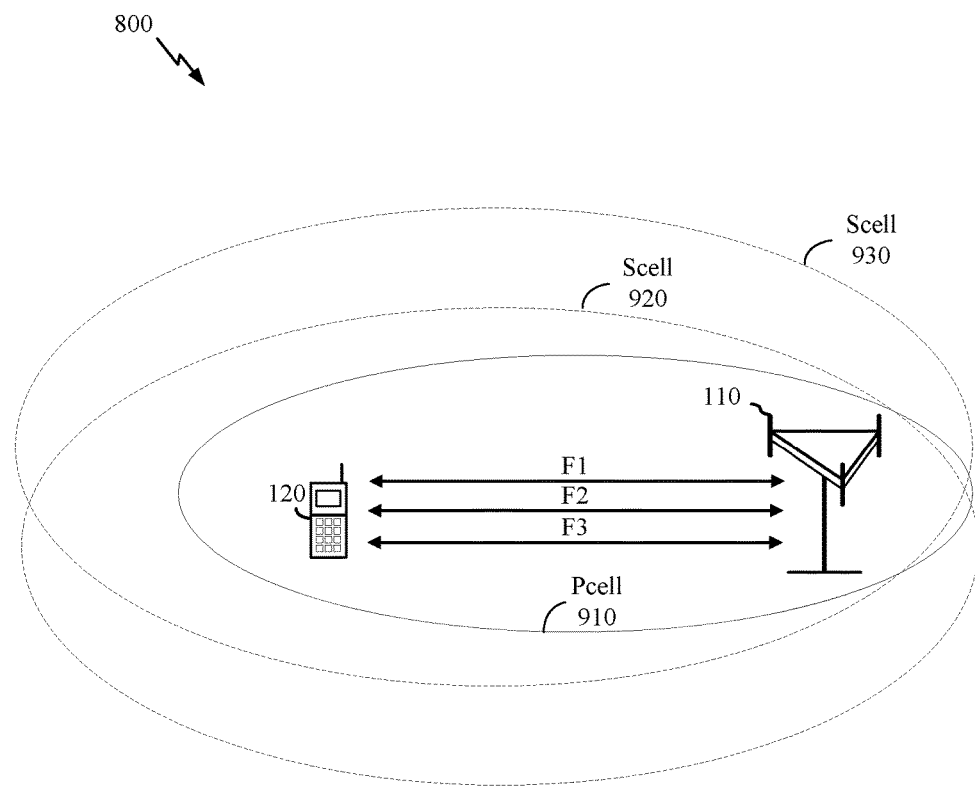
FIG. 9 shows an example wireless communications network diagram including a carrier aggregation (CA) capable UE in communication with a primary serving cell (Pcell) and two secondary serving cells (Scells), in accordance with certain aspects of the present disclosure.

FIG. 9 shows an example wireless communications network diagram including a CA capable UE 120 in communication with a primary serving cell (Pcell) 910 and two secondary serving cells (Scells), Scell 920 and Scell 930. As shown in FIG. 9, in a carrier aggregation scenario, UE 120 may communicate with BS 120 that is able to provide coverage using three separate frequency resources, F1, F2, and F3, each of which may be referred to as a CC, as described above. As shown, each of the CC radio frequency resources, F1, F2, and F3, may be associated with a carrier cell. For example, F1 may be associated with Pcell 910, F2 may be associated with Scell 920, and F3 may be associated with Scell 930.

According to various embodiments, a UE (e.g., UE 120) utilizing CA may be configured to aggregate certain functions of multiple carriers, such as control and feedback functions, on the same carrier, which is the primary component carrier (PCC) (i.e., F1) associated with Pcell 910. For example, the UE may aggregate control functions such as those provided by the optional dedicated channel (DCH), the nonscheduled grants, a physical uplink control channel (PUCCH), and/or a physical downlink control channel (PDCCH). Also, the RRC connection, for example, is handled by one cell, Pcell 910, served by the PCC (DL and UL PCC). It is also on the DL PCC that the UE receives NAS information, such as security parameters. In idle mode, the UE listens to system information on the DL PCC. In an example CA configuration, one CC can be configured as the PCC for the UE and at most one other CC can be configured as the primary secondary CC. Only the PCC and the primary secondary CC may carry the physical uplink control channel (PUCCH). The UE may monitor common search space only on the Pcell.

All other CCs may be referred to as secondary CCs (SCCs), serving the Secondary serving cells (Scell). Each SCC can be configured for uplink only, downlink only, or for both uplink and downlink. The one or more SCCs depend on the PCC for support and are added and removed as required, while the PCC is only changed at handover.

In certain systems (e.g., LTE systems operating according to Release 13 of the wireless standards and greater), a UE can be configured with up to 32 CCs for CA, for example. Each CC may be up to 20 MHz in size (e.g., and may be backward compatible). Therefore, up to 640 MHz of bandwidth can be configured for a UE (e.g., 32 CC×20 MHz per CC).

The CCs in CA can be all be configured as frequency division duplexing (FDD) CCs, as all time division duplexing (TDD) CCs, or configured as a mixture of FDD CCs and TDD CCs. Different TDD CCs may have the same or different downlink uplink (DL/UL) configurations. Special subframes can also be configured differently for different TDD CCs.

It should be noted that while the preceding specifically refers to CA for LTE-Advanced UEs, the same general concept of CA applies to other types of UEs and base stations (e.g., BSs/UEs configured to operate in a new radio (NR) system according to a 5G specification).

Example Carrier Aggregation Capable Wireless Communication Device

As described above, a CA capable wireless communication device (e.g., UE 120) may aggregate two or more CCs. To transmit and receive signals on each of these CCs, the CA capable wireless communication device may have a plurality of RF chains that may, for example, correspond to the number of CCs that are aggregated by the device.

Figure 10:
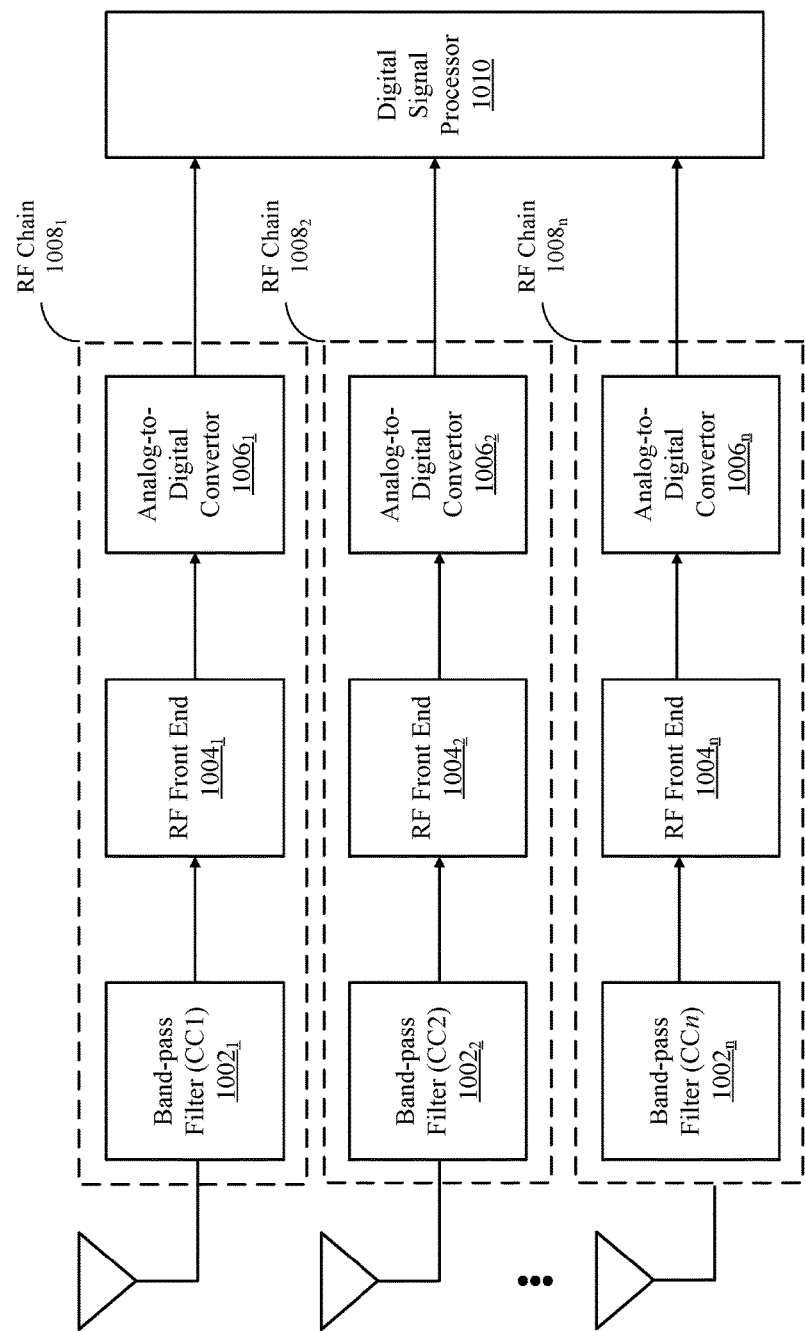
FIG. 10 illustrates example transceiver architecture, in accordance with certain aspects of the present disclosure.

FIG. 10 illustrates an example carrier aggregation capable wireless communication device including a plurality of RF chains, which can be used to support respective component carriers (CCs). For example, the first RF chain $1008_1$ may be used for CC1, the second RF chain $1008_2$ may be used for CC2, and the $n^{th}$ RF chain $1008_n$ may be used for CCn.

As shown in FIG. 10, each RF chain may include an RF band-pass filter 1002, an RF front end 1004, and an analog-to-digital converter (ADC) 1006. A band-pass filter (e.g., band-pass filter 1002) is a component that passes frequencies within a certain range and rejects or attenuates frequencies outside that range. For example, band-pass filer $1002_1$, used for CC1, passes frequencies within the range of CC1, and attenuates frequencies outside the range of CC1. As shown in FIG. 10, an RF chain may also include an RF front end 1004, which may include all the circuitry between band-pass filter 1002 (or the antenna) to ADC 1006. ADC 1006 is a component that digitizes the analogue signals received from RF front end 1004 and passes them to digital signal processor (DSP) 1010, which further processes the digital signals by, for example, performing intermediate frequency (IF) filtering and demodulation. As shown in FIG. 10, when signal is received from a CC at a receiver antenna, it is filtered by band-pass filer 1002 and then travels a signal path through the RF chain for demodulation and decoding. Accordingly, the number of RF chains included in the RF circuitry within a wireless device corresponds to the number of receive signal paths.

One of ordinary skill in the art appreciates that the RF chain architecture of FIG. 10 is illustrated by way of example, and not by way of limitation. Accordingly, an RF chain used by a CA capable wireless communication device may include additional and/or alternative components to those illustrated in FIG. 10.

Example Intelligent Resource Assignment to Increase Throughput in Multiple Input Multiple Output (MIMO) and Carrier Aggregation (CA) Capable Devices Generally, adding a higher number of RF chains (e.g., to LTE MIMO and CA wireless communication devices) results in further improving link quality and reliability, bandwidth, and/or throughput between devices. However, design and/or cost-related concerns (or other factors) may limit the number of RF chains implemented in a MIMO and CA capable wireless communication device (e.g., UE 120), such as smart phones or similar user devices.

In other words, the modem component of such devices may have only a limited number of wideband and/or narrowband chains. As a result, the number of distinct signals paths for demodulating and decoding signals received by the wireless communication device's antennas are limited due to design and/or cost-related concerns. It, therefore, becomes critical to more efficiently utilize the limited number of RF chains and assign them to various CCs in a way that throughput is maximized. Also, in some cases, channel conditions may change and, therefore, a certain RF chain assignment that is optimal at some point in time may not be optimal any longer.

Accordingly, certain embodiments described herein relate to assigning or reassigning RF chains of a wireless communication device (e.g., UE 120) to different CCs in a manner that may be designed to optimize system performance, for example, by increasing or maintaining throughput in changing channel conditions.

Figure 11:
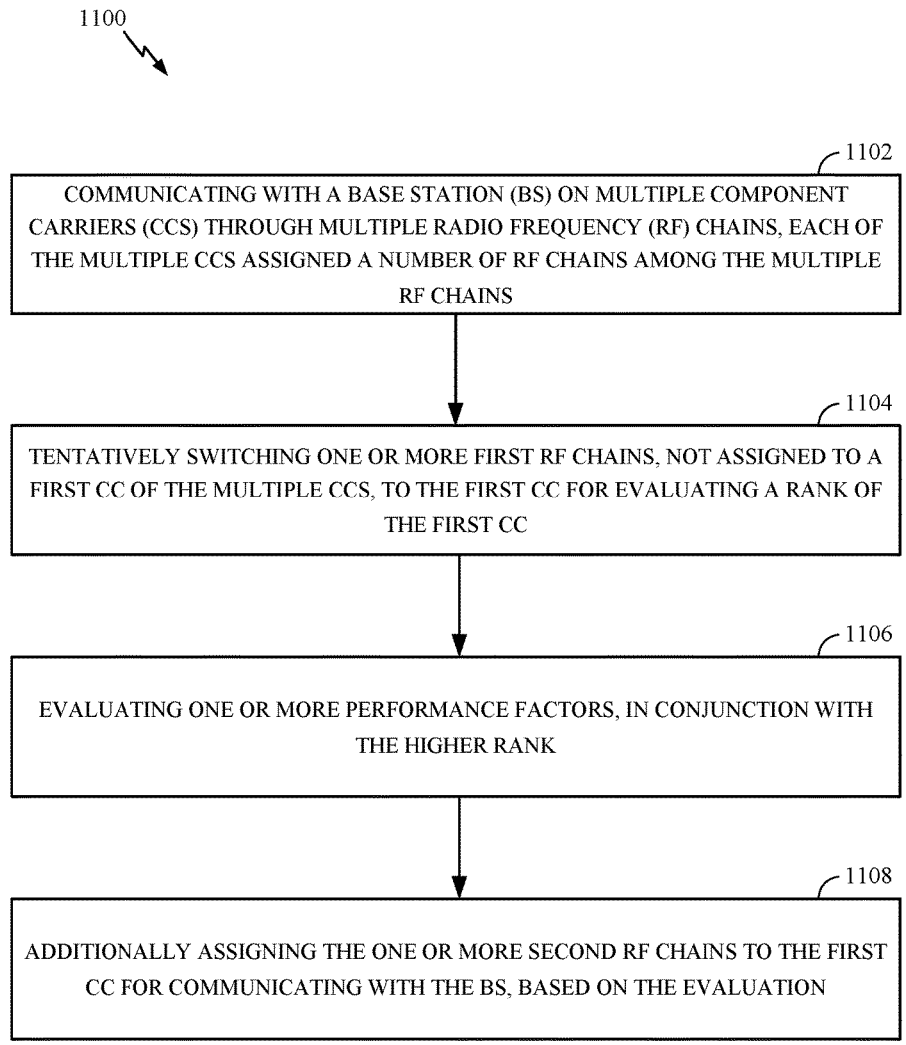
FIG. 11 illustrates example operations for wireless communications by a UE, in accordance with certain aspects of the present disclosure.

FIG. 11 illustrates example operations 1100 for wireless communications by a wireless communication device, in accordance with aspects of the present disclosure. In some embodiments, the wireless communication device may, for example, be a user equipment (UE) (e.g., UE 120).

Operations 1100 begin, at 1102, by communicating with a base station (BS) on multiple component carriers (CCs) through multiple radio frequency (RF) chains, each of the multiple CCs assigned a number of RF chains among the multiple RF chains. At 1104, the UE tentatively switches one or more RF chains, not assigned to a first CC of the multiple CCs, to the first CC for evaluating a rank of the first CC. At 1106, the UE evaluates one or more performance factors, in conjunction with the higher rank. At 1108, the UE additionally assigns the (tentatively switched) one or more RF chains to the first CC for communicating with the BS, based on the evaluation.

As described above, a wireless communication device (e.g., UE 120) may not only be capable of CA, but it may also communicate with a BS (e.g., BS 110) using MIMO functionalities in order to multiply the capacity of a radio link using multiple transmit and receive antennas.

Wireless communication devices (e.g., UE 120) in a wireless network implementing the MIMO functionality may generally operate in one of a number of transmission modes (TM1-TM9) based on feedback that UE 120 may provide to a corresponding BS (e.g., BS 110) or network. The transmission modes can be broadly classified into two main modes of spatial diversity and spatial multiplexing. With spatial diversity, each one of multiple transmit antennas at a transmitter sends the same data to multiple receive antennas at the receiver through multiple data streams. The receiver then utilizes its receive RF chains to combine all the signals, which contain the same data, resulting in a gain in the signal-to-noise ratio (SNR). In situations where the transmitter uses spatial diversity, the receiver may operate in a higher order receive diversity (HORxD) mode.

With spatial multiplexing, each one of multiple transmit antennas at a transmitter sends independent and separately encoded data signals to all receive antennas at the receiver, in the same frequency channel, through multiple streams. The receiver then utilizes its different receive RF chains to decode and combine the different and independent data streams to reconstruct the source data, which results in increasing the throughput or data rate.

The determination of whether the UE and the BS should operate in the spatial diversity mode or the spatial multiplexing mode may depend on a rank indication that is measured and reported by, for example, the receiver. For example, the receiver (e.g., UE 120) may measure the channel elements and determine a certain rank indication (RI) (e.g., RI of 2), which indicates the number of independent data streams that the UE is able to successfully receive. The UE then signals the RI to the BS, which activates either the spatial diversity or the spatial multiplexing mode based on the RI. For example, if the RI is 2, the transmitter activates the spatial multiplexing mode and creates two independent data streams, each including different data symbols, which are transmitted to the receiver using two different transmit antennas. An RI larger than two indicates the UE's ability to successfully receive a higher number of data streams or layers. However, if the RI is 1, then the BS activates the spatial diversity mode, as described above, to transmit the same data symbols to the UE using a number of transmit antennas.

As described above, a CA capable UE may include a number of RF chains, each corresponding to a distinct signal path. The signal paths of the UE may be utilized in several possible combinations when the UE is in CA mode and MIMO is supported by the BS. As an example, a UE with 8 RF chains or signal paths may assign the RF chains to a PCC and one or more SCCs in several different ways. In an example where the UE is aggregating a PCC and three SCCs, the UE may assign 2 RF chains to each of the CCs. In another example, where the UE aggregates a PCC and two SCCs (e.g., SCC1 and SCC2), the UE may assign 4 RF chains to PC in a 4×4 MIMO mode and further assign 2 RF chains to SCC1 and 2 chains to SCC2. In yet another example, where the UE aggregates a PCC and two SCCs (e.g., SCC1 and SCC2), the UE may assign 2 RF chains to the PCC, 4 RF chains to SCC1 in a 4×4 MIMO mode, and 3 RF chains to SCC2. The combinations described above are merely to illustrate the variety of different ways a CA and MIMO capable UE may communicate with a BS using its RF chains.

As described above, certain embodiments described herein relate to assigning RF chains of a wireless communication device (e.g., UE 120) to different component carriers such that throughput is increased. For example, in some embodiments, a CA capable wireless communication device (e.g., UE 120) may determine the channel conditions (e.g., channel quality indicator (CQI)), signal-to-noise ratio (SNR), network grant, and/or the RI of each CC to determine the number of receive RF chains that should be assigned to each CC (e.g., PCC and one or more SCCs) in order to increase the overall throughput.

In some embodiments, if a CC is operating in a spatial diversity mode (HORxD mode), the UE may measure one or more parameters relating to the channel conditions and SNR of the CC to determine the number of RF chains to be assigned to the CC in order to increase throughput. Generally, for a CC operating in the spatial diversity mode, assigning an additional RF chain to the CC results in an SNR improvement (e.g., of 1-3 db in certain/common field conditions).

However, as described above with reference to FIG. 11, prior to assigning an additional RF chain to a CC operating in the spatial diversity mode, a UE may determine or measure the SNR relating to the CC, based on which the UE may further determine if assigning an additional RF chain to the CC improves the throughput by a certain threshold value. For example, after performing the SNR measurement, if the SNR of the CC operating in the spatial diversity mode is already above the certain threshold, then any further increase in the SNR may not result in any significant improvement in throughput contributed by that CC. Therefore, assigning an additional RF chain to the CC may not be effective. In that case, assigning the additional RF chain to another CC, whose SNR is below the certain threshold value, may be more effective and lead to a more significant improvement in the overall throughput.

In some embodiments, if a CC is operating in the spatial multiplexing mode, the UE may consider one or more parameters, including a RI of the CC, in order to determine if assigning an additional RF chain to the CC results in an increase in the throughput. As described above, the RI of a CC indicates how many independent data streams or layers can be decoded by the UE based on the channel conditions and the UE's antenna separation. If an RI of a certain CC is, for example, 4, then 4 RF chains may be allocated to that CC in order to enable the CC to operate in the highest transmission mode possible, thereby, resulting in a higher throughput. In some embodiments, two or more CCs may have the same rank, in which case, a network grant of each CC may also be examined. In such embodiments, the CC with a higher network grant may be assigned additional RF chains as opposed to CCs with a lower network grant.

FIGS. 12-15 below illustrate various scenarios in which the UE may determine one or more parameters relating to a CC, operating in one of the spatial diversity or spatial multiplexing modes. Based on the one or more parameters, the UE may then determine if assigning an additional one more of RF chains to the CC increases throughput.

Figure 12:
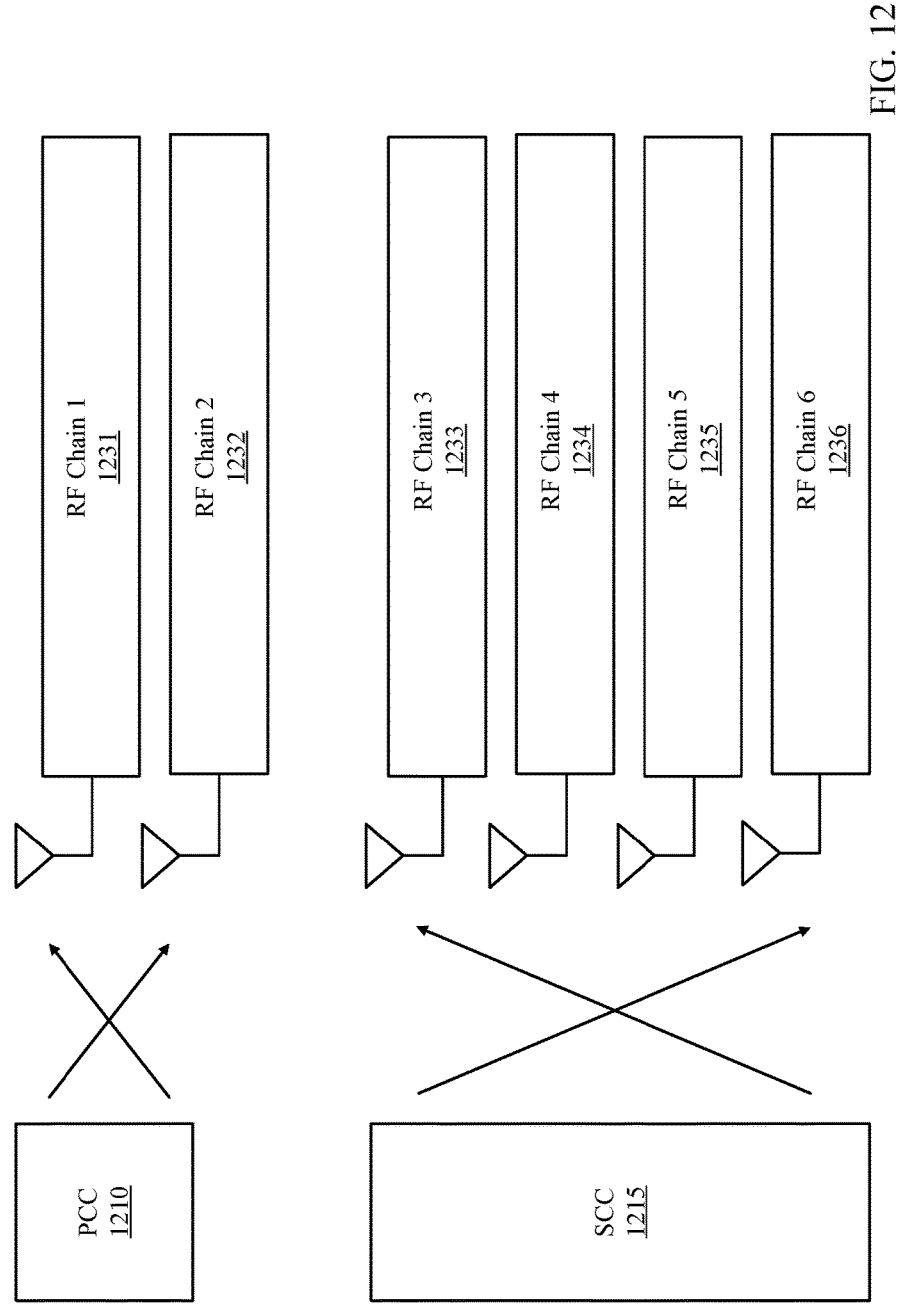
FIG. 12 illustrates an example RF chain assignment where a set of radio frequency (RF) chains in a UE has been assigned to a number of component carriers (CCs).

FIG. 12 illustrates an example RF chain assignment where a set of RF chains in a UE (e.g., UE 120) has been assigned to a number of CCs. As shown, the UE includes 6 receive RF chains (i.e., 1231-1236), 2 of which (i.e., 1231-1232) are assigned to PCC 1210, which has a rank of 2 and operates in a 2×2 MIMO mode. FIG. 12 also illustrates SCC 1215 that has a current rank of 2 operating in a 2×2 mode utilizing 4 receive RF chains (i.e., 1233-1236) in HORxD mode. In the example shown in FIG. 12, all the RF chains 1231-1236 are occupied by the PCC 1210 and SCC 1215. However, since the RI of each CC may change dynamically in field conditions, in some embodiments, one or more available chains may be reassigned to one or more active CCs (i.e., PCC 1210 and SCC 1215) to enable the CCs to operate at the highest RI available, thereby increasing throughput. In the example above, the UE may momentarily and periodically drop the HORxD mode and allocate two chains (e.g., RF chains 1233 and 1234) of SCC 1215 to PCC 1210 to evaluate if a higher RI can be determined on PCC 1210.

In such an example, if the UE determines a higher rank on PCC 1210, such as 4, the UE may then determine the SNR of SCC 1215 and the network grant on PCC 1210. In such embodiments, the UE may then assign the two RF chains of SCC 1215 to PCC 1210, to enable PCC 1210 to operate in a full rank 4×4 mode, upon determining that the network grant of PCC 1210 is high enough such that switching to a full rank on PCC 1210 improves the overall UE throughput, even if there is a slight reduction of the throughput due to the reduction in SNR of SCC 1215 caused by the chain reassignment. If the network grant of 1210 is not high enough, then the UE may not assign any additional chains to PCC 1210.

Figure 13:
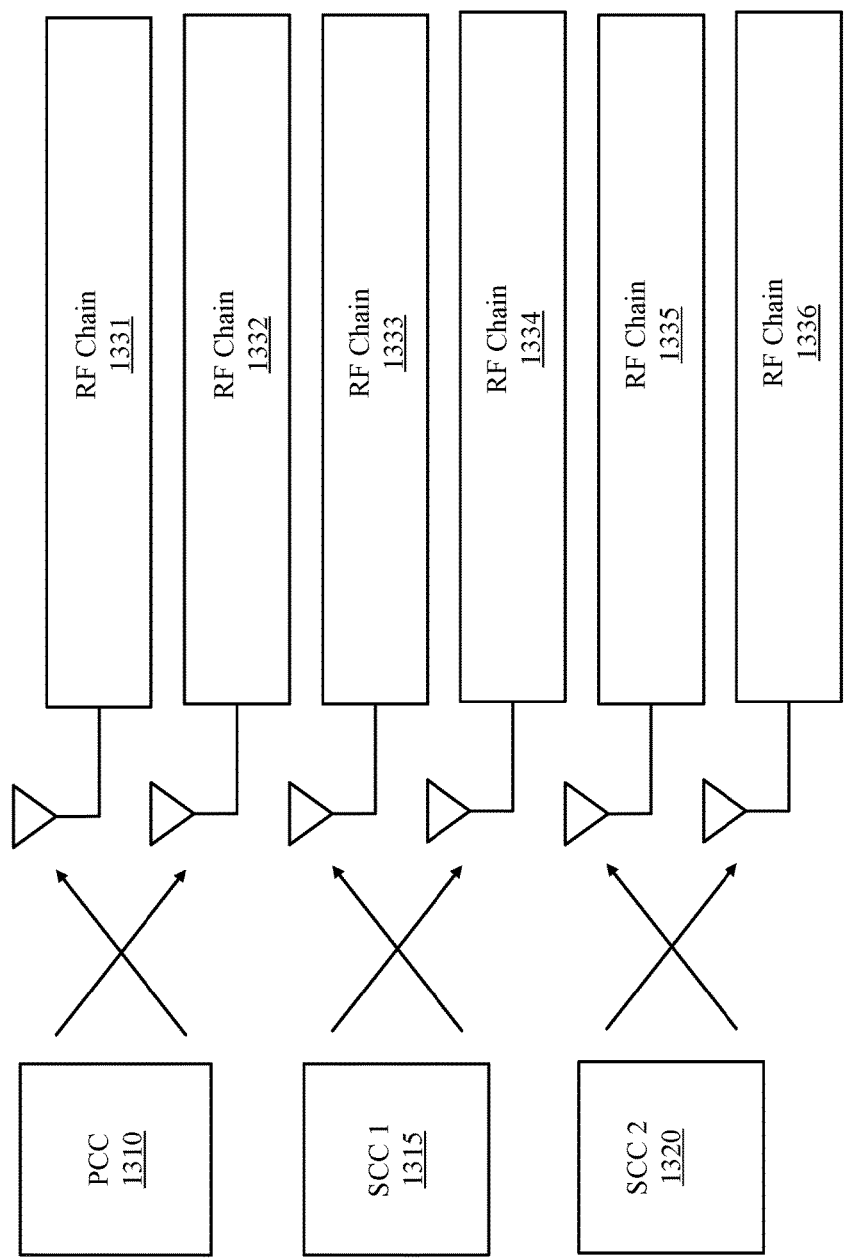
FIG. 13 illustrates an example RF chain assignment where a set of RF chains in a UE has been assigned to a number of CCs.

FIG. 13 illustrates another example RF chain assignment where a set of RF chains in a UE (e.g., UE 120) has been assigned to a number of CCs. As shown, the UE includes 6 receive RF chains (i.e., 1331-1336), 2 of which (i.e., 1331-1332) are assigned to PCC 1310, which has a rank of 2 and operates in a 2×2 MIMO mode. FIG. 13 also shows SCC 1315 and SCC 1320, each having a rank of 2 and operating in a 2×2 MIMO mode.

In some embodiments, the UE may periodically determine a network grant and RI for each of the CCs. In some embodiments, the UE may periodically use receive RF chains of other CCs to evaluate whether the RI for a certain CC increase (i.e., by switching those RF chains to the certain CC). The UE, in some embodiments, may perform this evaluation for each of the CCs. For example, the UE may tentatively switch one or more RF chains of SCC 1315 to PCC 1310 and evaluate whether the RI for PCC 1310 increases. The UE may also tentatively switch one or more RF chains of PCC 1310 to SCC 1315 to evaluate whether the RI for SCC 1315 increases. As described above, in some embodiments, UE may continue to perform this evaluation for each of the CCs.

In some embodiments, the receive RF chains of other CCs may be inactive (e.g., no network grant etc.). For example, RF chains of SCC 1315 may be inactive immediately before the UE switches the RF chains to PCC 1310. In some embodiments, the UE may use cell-specific reference signals when the UE is in connected discontinuous reception (C-DRx) mode to evaluate if the rank for the certain CC increases. In some embodiments, the UE may use interfrequency (IF) measurement gaps, to evaluate if the RI for the certain CC increases to evaluate if the rank for the CC increases.

In some embodiments, if the RI associated with the certain CC (e.g., PCC 1310, SCC 1315, or SCC 1320), having a higher network grant than others, increases, the UE may start reporting the higher RI for that CC to the BS/network, in which case, a corresponding network scheduler may switch the certain CC to the higher rank by eliminating one of the other CCs. For example, after switching one or more RF chains of SCC 1320 to PCC 1310, if the UE determines that RI of PCC 1310 has increased, the UE may then report the higher RI of PCC 1310 to the BS/network. In some embodiments, in order to select which CC the RF chains may be taken from, the UE may measure network grant for all of the CCs, other than the CC to which the UE plans to assign the RF chains. In the example above, after determining that assigning additional RF chains to PCC 1310 is effective, the UE may measure the network grant of SCC 1315 and 1320 to determine which one has the lowest network grant/throughput. The UE may then report a lower/zero channel quality indicator (CQI) for the CC with the lowest grant/throughput contribution during a few frames. In response, in such embodiments, a corresponding network scheduler may drop the CC. In such embodiments, the UE may then use the relinquished receive RF chain(s) to operate the CC (e.g. PCC 1310 in the example above), having a higher network grant, in a higher RI mode.

In some embodiments, after evaluating whether a RI of each CC increases or decreases, the UE may report the change in RI of each of the CCs, as well as the number of RF chains assigned to the CC, to the BS, based on which the network scheduler may ensure that the UE is operated with multiples CCs in one or more modes that provide the maximum throughput.

In some embodiments, the UE may determine an increase in RI for more than one CC while there may only be a limited number of receive RF chains for assignment. For example, the UE may determine an increase in RI of 1 for SCC 1315, when an additional two RF chains are switched to it temporarily while the UE may determine an increase in RI of 2 for PCC 1310, as described above. In some embodiments, the UE may then determine to assign additional RF chains to the CC with the largest increase in RI as a result of the tentative switching of the RF chains (i.e., PCC 1310, in the example above).

Figure 14:
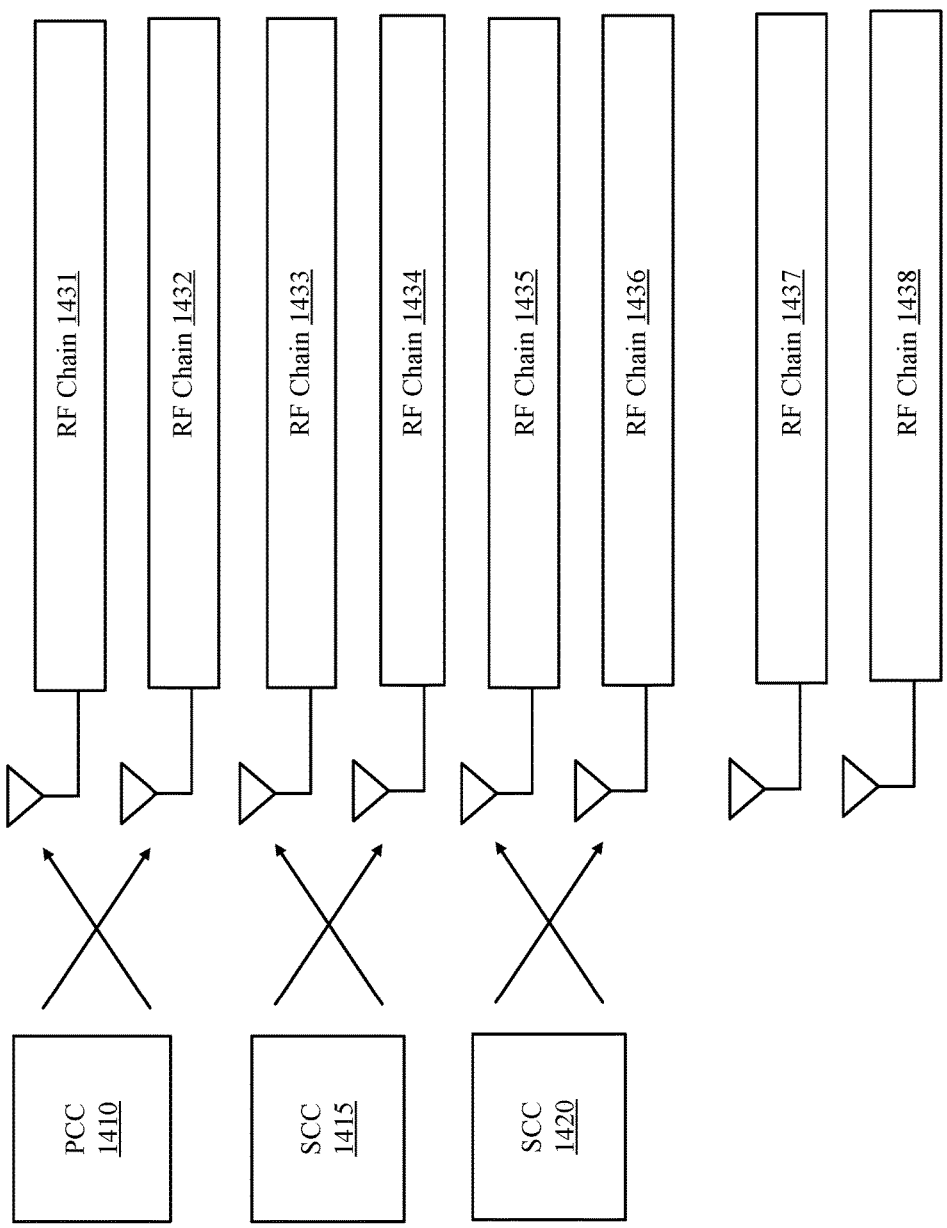
FIG. 14 illustrates an example RF chain assignment where a set of RF chains in a UE has been assigned to a number of CCs.

However, in some embodiments, the increase in RI for one CC may be the same as the increase in RI for the other CC. An example of this is illustrated by FIG. 14, which shows an example RF chain assignment including 8 receive RF chains 1431-1438, where 6 (i.e., 1431-1436) are in use and 2 (i.e., 1437-1438) are free. In such an example, PCC 1410 with a RI of 2 is assigned 2 of the receive chains (i.e., 1431-1432) and operates in a 2×2 MIMO mode, SCC 1415 with a RI of 2 may use another 2 receive chains (i.e., 1433-1434) operating in 2×2 mode, and SCC 1420 may use the remaining 2 active receive RF chains (i.e., 1435-1436) operating in 2×2 mode. In some embodiments, for example, the two free receive RF chains (i.e., 1437-1438) may be used for evaluating whether each CC sees a higher rank. In such an example, the UE may determine a higher RI for both SCC 1415 and SCC 1420. For example, the UE may determine a rank of 4 for both SCC 1415 and SCC 1420. In such embodiments, the two free RF chains (i.e., 1437-1438) may be assigned to the CC with a higher network grant. In other words, in such embodiments, the CC with a higher network grant is prioritized when the UE determines an equally higher RI for multiple CCs and there are not enough available RF chains for all the CCs to operate in a full rank mode.

Figure 15:
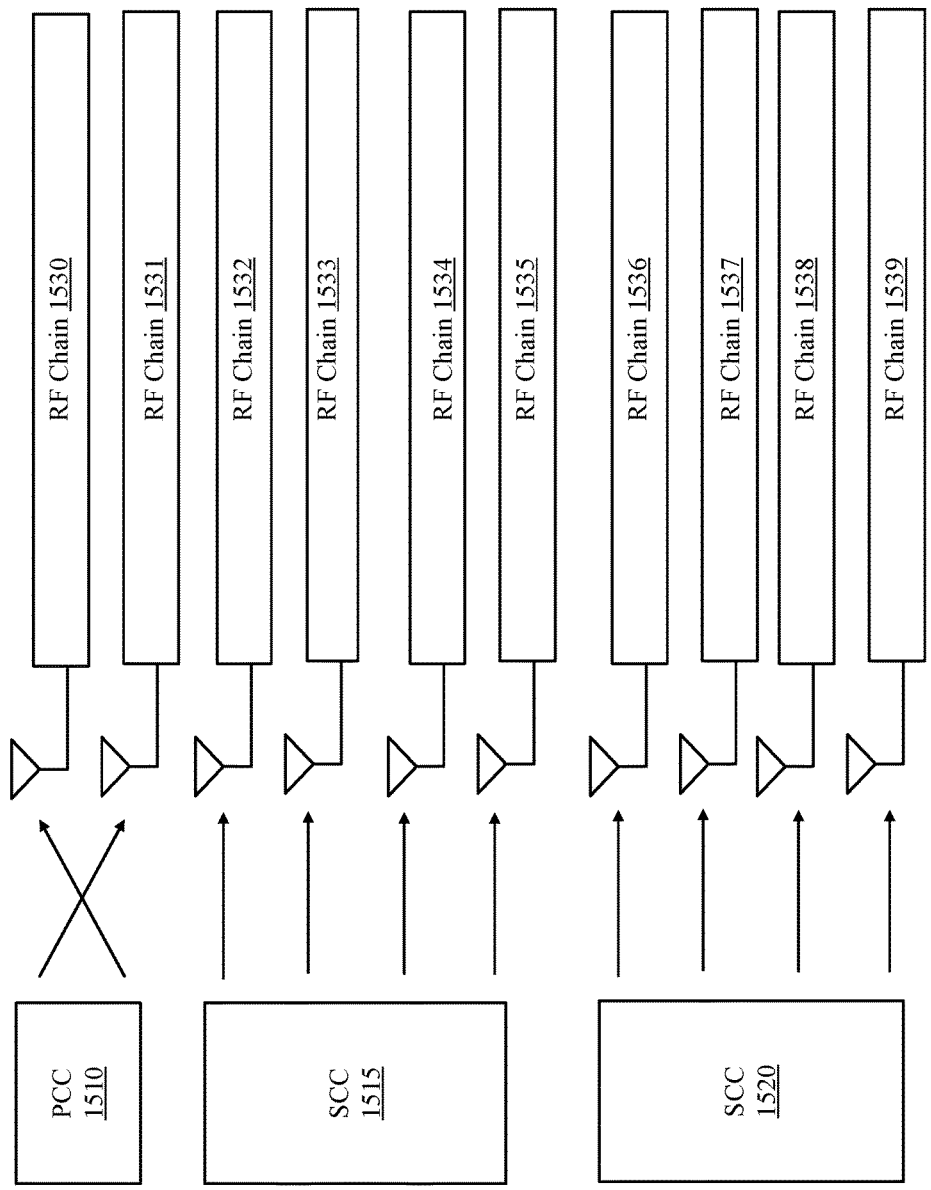
FIG. 15 illustrates an example RF chain assignment where a set of RF chains in a UE has been assigned to a number of CCs.

FIG. 15 illustrates another example RF chain assignment by depicting 10 receive RF chains (i.e., 1530-1539), 2 of which (i.e., 1530-1531) are assigned to PCC 1510, which has a rank of 2 and operates in a 2×2 MIMO spatial multiplexing mode. FIG. 15 also shows SCC 1515 and SCC 1520, each operating in a 4-way HORxD (i.e., spatial diversity) mode using 4 RF chains (i.e., RF chains 1532- 1535 and 1536-1539, respectively). In the embodiments of FIG. 15, the HORxD mode may be UE specific and the UE may select the mode based on the free receive RF chains as well as channel conditions and/or SNR of each CC. In such embodiments, the UE may enable PCC 1510 to periodically evaluate a higher RI by assigning one or more of the receive RF chains, allocated to SCC 1515 and/or SCC 1520, to PCC 1510. In some embodiments, the UE may opportunistically select or use RF chains (i.e., that are allocated to SCC 1515 and 1520 to assign to PCC 1510) that are inactive or for which there is no network grant. In some embodiments, even if all the RF chains are active and have a network grant, the UE may drop the HORxD order momentarily and assign one or more of the RF chains allocated to SCC 1515 and 1520 to PCC 1510. In some embodiments, the UE may use cell-specific reference signals, instead, when the UE is in C-DRx mode, as described above.

Once PCC 1510 has been tentatively assigned additional RF chains and the UE determines a higher RI for PCC 1510, in some embodiments, the UE may then check the SNR condition relating to the CCs in HORxD mode and select one or more RF chains from the CC whose SNR is above a certain threshold so that the reduction in SNR would lead (i.e., resulting from operating the CC using a lower number of chains) to a lower number of code failures. For example, the UE may momentarily assign 2 RF chains, initially assigned to SCC 1515 or 1520, to PCC 1510 and determine a RI of 4, indicating that operating PCC 1510 in a full 4×4 increases the throughput.

In such an example, instead of immediately assigning those two RF chains to PCC 1510 and operating the CC (i.e., SCC 1515 or SCC 1520, from which the 2 RF chains were taken) in a 2-way HORxD mode, resulting in a reduction of 3 db in the corresponding SNR and a large number of decode failures and throughput degradation, in some embodiments, the UE may measure the SNR of SCC 1515 and also SCC 1520 that are operating in the HORxD mode and select two RF chains from the SCC whose SNR is above a certain threshold, such that a reduction of 3 db in SNR would result in less decode failures. For example, the UE may measure the SNR of SCC 1515 and the SNR of 1520 and, for example, determine that the SNR of 1520 is above a certain threshold, such that a reduction of 3 db would not result in a lot of decoding failures. In such embodiments, the UE may take 2 RF chains from SCC 1520 and assign them to PCC 1510 and, subsequently, operate SCC 1520 in a 2-way HORxD mode.

In some embodiments, the UE may determine that both SCC 1515 and 1520 are operating in very low SNR conditions, such that a reduction of 3 db in the SNR of either SCC 1515 or SCC 1520 may result in a lot of decoding failures. In such embodiments, the UE may start operating both SCC 1515 and SCC 1520 in a 3-way HORxD mode, which results in a 1 db SNR reduction for both, and assign the 2 relinquished RF chains to PCC 1510 to operate PCC 1510 in a full 4×4 mode.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for generating, means for multiplexing, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
    communicating with a base station (BS) on multiple component carriers (CCs) through multiple radio frequency (RF) chains, wherein each of the multiple CCs are assigned a number of RF chains among the multiple RF chains;
    tentatively switching one or more first RF chains, not assigned to a first CC of the multiple CCs, to the first CC for evaluating a rank of the first CC, wherein the one or more first RF chains are assigned to a second CC of the multiple CCs prior to the switching;
    determining that the first CC has a higher rank indication (RI) with the one or more RF chains;
    evaluating one or more performance factors, in conjunction with the higher rank, wherein the one or more performance factors include a measurement of a reduction in throughput of the second CC due to the switching; and
    additionally assigning one or more second RF chains to the first CC for communicating with the BS, based on the evaluation.

2. The method of claim 1, wherein the one or more first RF chains are same as the one or more second RF chains.

3. The method of claim 1, wherein the one or more first RF chains are not active prior to the switching.

4. The method of claim 1, wherein the second CC operates in a higher order receive diversity (HORxD) mode.

5. The method of claim 4, wherein the one or more first RF chains are active.

6. The method of claim 5, further comprising:
    dropping the HORxD mode of the second CC prior to the switching.

7. The method of claim 1, wherein the second CC is in a connected discontinuous reception (C-DRx) mode prior to the switching.

8. The method of claim 1, wherein the second CC comprises RF chains that are inactive prior to the switching.

9. The method of claim 1, further comprising:
    reporting the higher RI determined for the first CC to a base station (BS) prior to the assigning.

10. The method of claim 1, wherein the evaluating the one or more performance factors comprises evaluating a throughput contribution of each of the multiple CCs.

11. The method of claim 10, wherein the evaluating further comprises selecting a CC from the multiple CCs with a lowest throughput contribution.

12. The method of claim 11, further comprising:
    reporting a low channel quality indicator (CQI) for the selected CC to the base station (BS).

13. The method of claim 12, wherein the one or more second RF chains are allocated to the selected CC prior to the assigning.

14. The method of claim 1, wherein the one or more performance factors comprise at least one of a signal-to-noise ratio (SNR) or a network grant size relating to the second CC.

15. The method of claim 1, wherein the one or more performance factors include a measurement of an increase in overall throughput of the UE in response to the switching.

16. The method of claim 15, wherein the evaluating further comprises determining that the increase in the overall throughput of the UE is greater than the reduction in the throughput of the second CC.

17. The method of claim 1, wherein a higher RI is determined for a third CC of the multiple CCs.

18. The method of claim 17, wherein the one or more performance factors include a network grant size of the first CC and a network grant size of the third CC, and wherein the network grant size of the first CC is higher than the network grant size of the third CC.

19. The method of claim 18, wherein the first CC is prioritized for the assigning based on having a higher network grant size.

20. The method of claim 1, wherein the one or more performance factors include a SNR relating to the second CC and a SNR relating to another CC of the multiple CCs.

21. The method of claim 20, wherein the evaluating further comprises selecting, from the second CC and the other CC, a CC whose SNR is above a threshold value for the assigning.

22. The method of claim 21, wherein the one or more performance factors further include a network grant size relating to the second CC and a network grant size relating to the other CC of the multiple CCs, and wherein the evaluating further comprises selecting, from the second CC and the other CC, a CC whose SNR is above a threshold value and whose network grant size is lowest for the assigning.

23. The method of claim 21, wherein the one or more second RF chains are allocated to the selected CC prior to the assigning.

24. The method of claim 20, wherein the evaluating further comprises determining that both the SNR of the second CC and the SNR of the other CC are below a threshold value.

25. The method of claim 24, wherein the one or more second RF chains comprise one or more RF chains from the one or more first RF chains and one or more RF chains from one or more RF chains of the other CC.

26. An apparatus for wireless communications, comprising:
- means for communicating with a base station (BS) on multiple component carriers (CCs) through multiple radio frequency (RF) chains, wherein each of the multiple CCs are assigned a number of RF chains among the multiple RF chains;
- means for tentatively switching one or more first RF chains, not assigned to a first CC of the multiple CCs, to the first CC for evaluating a rank of the first CC, wherein the one or more first RF chains are assigned to a second CC of the multiple CCs prior to the switching;
- means for determining that the first CC has a higher rank indication (RI) with the one or more RF chains;
- means for evaluating one or more performance factors, in conjunction with the higher rank, wherein the one or more performance factors include a measurement of a reduction in throughput of the second CC due to the switching; and
- means for additionally assigning one or more second RF chains to the first CC for communicating with the BS, based on the evaluation.

27. A non-transitory computer readable medium having instructions stored thereon for performing a method comprising:
- communicating with a base station (BS) on multiple component carriers (CCs) through multiple radio frequency (RF) chains, wherein each of the multiple CCs are assigned a number of RF chains among the multiple RF chains;
- tentatively switching one or more first RF chains, not assigned to a first CC of the multiple CCs, to the first CC for evaluating a rank of the first CC, wherein the one or more first RF chains are assigned to a second CC of the multiple CCs prior to the switching;
- determining that the first CC has a higher rank indication (RI) with the one or more RF chains;
- evaluating one or more performance factors, in conjunction with the higher rank, wherein the one or more performance factors include a measurement of a reduction in throughput of the second CC due to the switching; and
- additionally assigning one or more second RF chains to the first CC for communicating with the BS, based on the evaluation.

* * * * *